United States Patent [19]
Everhard et al.

[11] Patent Number: 5,954,081
[45] Date of Patent: Sep. 21, 1999

[54] INFLATION VALVE HAVING OVER PRESSURE PROTECTION

[75] Inventors: Kenneth D. Everhard, Wadsworth; Donald H. Smith, Cuyahoga Falls, both of Ohio

[73] Assignee: Aircraft Braking Systems Corporation, Akron, Ohio

[21] Appl. No.: 08/917,240

[22] Filed: Aug. 25, 1997

[51] Int. Cl.⁶ .................................................. F16K 17/16
[52] U.S. Cl. ...................................... 137/68.23; 137/223
[58] Field of Search ........................ 137/68.19, 68.23, 137/223

[56] References Cited

U.S. PATENT DOCUMENTS

| | | | |
|---|---|---|---|
| 3,404,698 | 10/1968 | Rouse | 137/68.23 |
| 3,834,412 | 9/1974 | Fanvin | 137/68.23 |
| 4,365,643 | 12/1982 | Marclet et al. | 137/72 X |
| 5,197,718 | 3/1993 | Wallis | 137/68.23 X |

Primary Examiner—John Fox
Attorney, Agent, or Firm—Renner, Kenner, Greive, Bobak, Taylor & Weber

[57] ABSTRACT

An inflation valve having overpressure protection has an inflation core which is coaxial with an exhaust port, both of which are coaxial with an exhaust plenum maintained within a body portion of the inflation valve. The inflation core communicates with a circular chamber which also communicates with radial passages extending within the base portion to an annular chamber which communicates with radial passages which interconnect with the wheel entry port. The exhaust plenum is sealed from the wheel entry port and the pressure of the associated tire by a rupture disk. Exhaust ports extend through the body portion of the valve from the exhaust plenum to atmosphere. When an overpressure condition exists within the tire, exceeding the characteristic pressure of the rupture disk, the rupture disk opens and allows the pressure within the tire envelope to escape through the wheel entry port, exhaust plenum, and exhaust ports. An elastomeric band or sleeve is received about the body portion 12 and over the exhaust port to seal them from dirt and the ambient until such time that the band is blown away or otherwise disturbed when the rupture disk opens on an overpressure condition.

15 Claims, 1 Drawing Sheet

INFLATION VALVE HAVING OVER PRESSURE PROTECTION

TECHNICAL FIELD

The invention herein resides in the art of inflation valves and, more particularly, to inflation valves for aircraft wheels. Specifically, the invention relates to an inflation valve which includes over pressure protection. More specifically, the invention relates to an inflation valve which incorporates a rupture disk to provide over pressure protection.

BACKGROUND ART

It is well known that inflation valves are typically employed to provide for ingress of air pressure into a sealed unit such as a tire or the like. It is also well known that overpressure plugs may be employed for safety purposes to assure that the inflation of the tire on the wheel does not exceed prescribed limits. Indeed, the use of overpressure plugs on aircraft wheels has, in recent years, become the norm.

Presently, the use of overpressure plugs requires that two orifices be provided in the tire wheel. A first orifice is employed for the inflation valve, while a second orifice receives the overpressure plug. As a consequence, existing wheels which have but a single orifice (intended for receipt of an inflation valve) are not adapted to readily receive an overpressure plug. In order to adapt such existing wheels to receive both an inflation valve and an overpressure plug, the wheels must be taken out of service and re-machined to provide the additional orifice. Moreover, even those wheels which are presently being manufactured require the additional cost of adding a second orifice to the wheel for the receipt of an over-inflation plug.

Presently, it is known to employ an inflation valve which includes overpressure relief. However, the techniques and structures presently employed rely upon the use of spring loaded devices to regulate the relief pressure flow. The reliability and cost of these structures has not proven to be sufficient to achieve wide spread use by the airlines. Accordingly, in order to achieve the highest degree of reliability, it appears to still be necessary to separately include overpressure plugs and inflation valves. The presently employed overpressure plugs which have enjoyed the greatest amount of success are rupture disks which have been found to be rather precise devices having a pressure burst accuracy on the order of ±5%. A number of airlines have been using such rupture disks for several years. In light of the foregoing, there is a need in the art for an inflation valve which provides for over pressure protection in a single unit. Employing such a device, the wheels presently in use which have but a single orifice can be retrofitted to receive the enhancement. Moreover, newly manufactured wheels will still require but a single orifice, maintaining a high level of structural integrity, while reducing manufacturing expenses.

DISCLOSURE OF INVENTION

In light of the foregoing, it is a first aspect of the invention to provide an inflation valve having overpressure protection, in which both inflation and overpressure deflation are achieved through the same unit.

Another aspect of the invention is the provision of an inflation valve having overpressure protection in which a rupture disk is employed in an inflation valve.

Still a further aspect of the invention is the provision of an inflation valve having overpressure protection in a symmetrical inline arrangement resulting in reduced space and weight over the prior art approaches.

A further aspect of the invention is the provision of an inflation valve having overpressure protection which is highly reliable and durable in use.

An additional aspect of the invention is the provision of an inflation valve having overpressure protection which may be readily retrofitted to presently existing aircraft wheels.

Still a further aspect of the invention is the provision of an inflation valve having overpressure protection which is reliable and durable in use, while being easily constructed using state of art techniques and devices.

The foregoing and other aspects of the invention which will become apparent as the detailed description proceeds are achieved by an inflation valve for aircraft wheels, comprising: a body portion defining an exhaust plenum and having exhaust ports in communication with said exhaust plenum and extending radially therefrom; a stem having an inflation core extending from a first end of said body portion; a head having a wheel entry port extending from a second end of said body portion; and a rupture disk maintained within said body portion and interposed between said exhaust plenum and said wheel entry port.

Other aspects of the invention which will become apparent herein are attained by an inflation valve for aircraft wheels, comprising: a body having a circular chamber at a first end thereof, an annular chamber at a second end thereof, an exhaust plenum therein, and a plurality of exhaust ports extending radially from said exhaust plenum; a stem extending from said first end of said body portion, said stem having a core communicating with said circular chamber; a head extending from said second end of said body portion, said head having a wheel entry port communicating with said annular chamber; and a rupture disk sealingly interposed between said exhaust plenum and said wheel entry port.

BRIEF DESCRIPTION OF THE DRAWING

For a complete understanding of the objects, techniques and structure of the invention reference should be made to the following detailed description and accompanying drawing wherein.

BEST MODE FOR CARRYING OUT THE INVENTION

Figure 1:
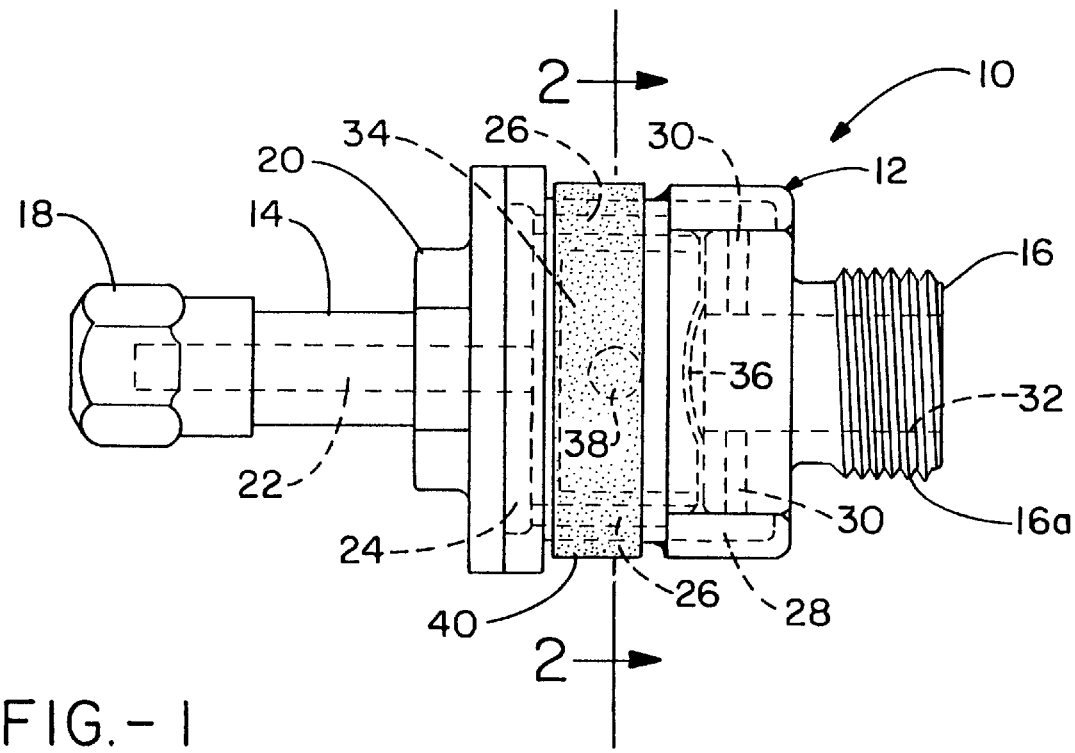
FIG. 1 is an elevational view showing in phantom the passages and chamber of the inflation valve for aircraft wheels made in accordance with the invention.
Figure 2:
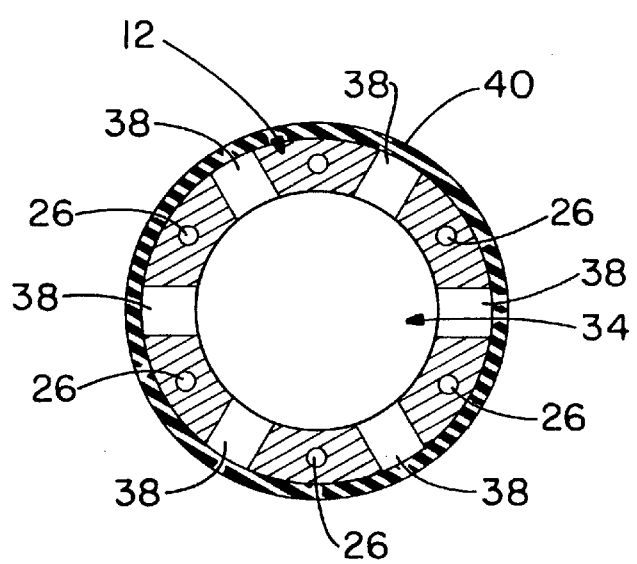
FIG. 2 is a cross sectional view of the valve of FIG. 1 taken along the line 2—2.

Referring now the drawings, it can be seen that an inflation valve having overpressure protection is designated generally by the numeral 10. The valve 10 includes a body portion 12 having a stem 14 extending from one end thereof and a head 16 extending from an opposite end thereof. It will be appreciated that the head 16 is threaded as at 16a for receipt into a threaded orifice in an aircraft wheel or the like.

The end of the stem 14 receives a cap 18 by threaded engagement or other appropriate means, as is well known and understood by those skilled in the art. A hex collar 20 is provided for receipt of a wrench or the like for threadedly engaging the inflation valve 10 to the wheel, in standard fashion.

An inflation core 22, of any standard or suitable nature, is received by the stem 14, as shown. Those skilled in the art will appreciate that the inflation core 22 provides for the passage of air, under pressure, from an inflation device and into a tire received by the wheel. The inflation core 22 typically includes an appropriate valve or the like to assure self sealing after the inflation process is completed. In any event, the inflation core 22 communicates with a chamber 24 within the body 12. In the preferred embodiment of the invention, the chamber 24 is circular in nature.

The chamber 24 communicates with a plurality of axial passages 26 to an annular chamber 28 at an end of the body 12 opposite that receiving the circular chamber 24. While any number of axial passages 26 may be employed, six such axial passages are utilized in the preferred embodiment of the invention illustrated herein. Extending from the annular chamber 28 are a plurality of radial passages 30 which pass through the body portion 12 and communicate with an axially positioned wheel entry port 32, as shown. Again, while any suitable number of radial passages 30 may be employed, six such passages are utilized in the preferred embodiment.

It should now be apparent that inflation of a tire by means of the inflation valve 10 received by a wheel associated therewith is rather straight forward. With the cap 18 removed, a source of air pressure is applied to the end of the valve stem 14 such that air flows through the inflation core 22, into the circular chamber 24, through the axial passages 26, into the annular chamber 28, through the radial passages 30, and into the wheel entry port 32, from which the pressurized air enters the envelope of the tire received by the wheel.

Also included as part and parcel of the inflation valve 10 is an exhaust plenum 34 which is centrally maintained within the body portion 12. A rupture disk 36 seals the exhaust plenum 34 from the wheel entry port 32, as illustrated. A plurality of exhaust ports 38 extend radially from the body portion 12 and into the exhaust plenum 34. Again, while any suitable number of such exhaust ports may be employed, the preferred embodiment utilizes six such ports. A band or sleeve 40 is received over the body portion 12 at the area of exhaust ports 38. According to the invention, the band or sleeve 40 is of an elastomeric material so as to provide a dirt seal over the exhaust ports 38. It will be appreciated, however, that when the rupture disk 36 is blown out by overpressure, the air which escapes from the tire envelope and into the exhaust plenum 34 escapes out of the exhaust ports 38 and blows the band or sleeve 40 off of the housing 12, or greatly disturbs it such that it can be readily observed that the overpressure relief has been experienced. The band 40 thus serves as an indicator of overpressure activity.

Those skilled in the art will readily appreciate that the rupture disk 36 may be of any suitable type presently available on the market, but employed separately as an overpressure device, separate and apart from an inflation valve. The rupture disk 36 has a characteristic pressure at which it is blown away from its sealed engagement over the wheel entry port 32, allowing for communication between the envelop of the associated tire, the exhaust plenum 34, the exhaust ports 38, and ambient.

It should be apparent that the preferred embodiment of the invention teaches a symmetrical valve arrangement, in which the exhaust plenum 34 is centrally maintained within the housing 12 and axially displaced between the circular chamber 24 and the radial passages 30. Moreover, the exhaust plenum 34 is radially positioned centrally among the axial passages 26, while the inflation core 22, wheel entry port 32, and exhaust plenum 34 are all axially aligned. Similarly, the axial passages 26 are uniformly spaced about the circumference of the housing 12, while the exhaust ports 38 are similarly uniformly spaced therethrough.

Thus it can be seen that the objects of the invention have been satisfied by the structure presented above. While in accordance with the patent statutes only the best mode and preferred embodiment of the invention has been presented and described in detail, the invention is not limited thereto or thereby. Accordingly, for an appreciation of the scope and breadth of the invention reference should be made to the following claims.

What is claimed is:

1. An inflation valve for aircraft wheels, comprising:
   a body portion defining an exhaust plenum said body portion having a first end including a wheel entry port, and having exhaust ports in communication with said exhaust plenum and extending radially therefrom;
   a stem having an inflation core extending from a second end of said body portion; and
   a rupture disk maintained within said body portion and interposed between said exhaust plenum and said wheel entry port.

2. The inflation valve for aircraft wheels according to claim 1, wherein said body portion has axial passages in communication with said inflation core.

3. The inflation valve for aircraft wheels according to claim 2, wherein said axial passages communicate with radial passages within said body, said radial passages communicating with said wheel entry port.

4. The inflation valve for aircraft wheels according to claim 3, further comprising a first chamber interposed between said inflation core and said axial passages.

5. The inflation valve for aircraft wheels according to claim 4, further comprising a second chamber interposed between said radial passages and axial passages.

6. The inflation valve for aircraft wheels according to claim 5, wherein said first chamber is circular and said second chamber is annular.

7. The inflation valve for aircraft wheels according to claim 2, wherein said exhaust plenum is axially positioned between said first chamber and said radial passages.

8. The inflation valve for aircraft wheels according to claim 7, wherein said exhaust ports are radial and are positioned between said axial passages.

9. The inflation valve for aircraft wheels according to claim 8, further comprising a releasable seal about said body at said exhaust ports.

10. The inflation valve for aircraft wheels according to claim 9, wherein said seal comprises an elastomeric band.

11. An inflation valve for aircraft wheels, comprising:
    a body having a circular chamber at a first end thereof, an annular chamber at a second end thereof, an exhaust plenum therein, and a plurality of exhaust ports extending radially from said exhaust plenum;
    a stem extending from said first end of said body portion, said stem having a core communicating with said circular chamber;
    a head extending from said second end of said body portion, said head having a wheel entry port communicating with said annular chamber; and
    a rupture disk sealingly interposed between said exhaust plenum and said wheel entry port.

12. The inflation valve for aircraft wheels as recited in claim 11, further comprising an elastomeric band received about said body portion and covering said exhaust ports.

13. The inflation valve for aircraft wheels as recited in claim 12, further comprising axial passages interconnecting said circular chamber and said annular chamber.

14. The inflation valve for aircraft wheels as recited in claim 13, further comprising radial passages interconnecting said annular chamber with said wheel entry port.

15. The inflation valve for aircraft wheels as recited in claim 14, wherein said exhaust plenum is axially positioned within said body between said circular chamber and said radial passages and is radially positioned within said axial passages.

* * * * *